June 4, 1935.  T. V. DILLSTRÖM  2,003,647
ELECTRIC MOTOR
Filed Oct. 26, 1931  4 Sheets-Sheet 2

Inventors:
Torbjörn V Dillström
Per Anton Astradsson
Fredrik Dahlgren,
By Sommers & Young attys June 4, 1935.   T. V. DILLSTRÖM   2,003,647
ELECTRIC MOTOR
Filed Oct. 26, 1931    4 Sheets-Sheet 4

Patented June 4, 1935

2,003,647

UNITED STATES PATENT OFFICE 2,003,647

ELECTRIC MOTOR

Torbjörn Viktor Dillström and Per Anton Åstradsson, Stockholm, and Fredrik Dahlgren, Djursholm, near Stockholm, Sweden.

Application October 26, 1931, Serial No. 571,226
In Sweden June 4, 1930

17 Claims. (Cl. 172—126)

This invention relates to electric motors having a reciprocating rectilinear or rotary, for instance, rocking motion of the armature. The prior motors of this type have the drawback, inter alia, that either particular types of alternating currents or current interrupters of any type are necessary for their operation. It has also been proposed to construct motors of this type as synchronous motors, but such motors have the well-known drawbacks of the synchronous motors, for instance, the number of reciprocations is dependent of the frequency of the primary current and the armature must come into step or be brought in phase with the primary current by use of mechanical means, because the motor otherwise will not start. It is to be observed that reciprocating motors in most cases cannot be operated at the high number of reciprocations corresponding to the usual commercial frequencies, for instance, 60 cycles per second.

The object of this invention is, chiefly, to overcome said inconveniences and to create a motor driven by the common alternating current of substantially one frequency only without any current interruptions whatever and fit for use for all purposes which require a reciprocating motion. Further, the motor in accordance with the invention is independent of the frequency of the current, that is, the motor is an asynchronous or induction motor. The elimination of the current interrupters, and the use of commercial alternating current obviously means a great progress with regard to the reliability of service and economy.

A further object of this invention is to operate a reciprocating electric induction motor from a common commercial net of alternating currents having substantially one main frequency only, said current passing through the motor continuously without any interruption during operation. If poly-phase current is used, no change of the order of delivery of the phases of the current supplied to the motor is necessary.

A further object of this invention is to increase the efficiency of the motor, especially at the points of reversal. It is a well-known matter of fact that in the usual asynchronous motors the operation of the armature is unfavourable at low speeds of the armature, if the motor has a good efficiency at higher speeds. In the motor in accordance with this invention a good efficiency is attained both at low speeds and at higher speeds of the armature. The motor in accordance with this invention is particularly fit for use as a compressor, especially for refrigerating purposes.

The crank mechanisms heretofore used for driving piston compressors suffer from many drawbacks. The motor and the transmission must be supervised and lubricated and, therefore, cannot be placed within the closed refrigerating system. The stuffing boxes necessary for the sealing are unreliable and the machine cannot be operated without noise and vibrations. The motor in accordance with this invention does not suffer from said inconveniences. It is noiseless and free from vibrations, no lateral forces act on the piston and consequently the friction is reduced to a minimum; the motor is reliable and may be enclosed in the closed refrigerating system and lubricated by the cooling medium. The motor may, however, also be used for driving hammers, drills and other reciprocated tools, or, in fact, for all purposes requiring a reciprocating motion.

Other objects of the invention will be evident from the following specification.

Some embodiments of the invention are illustrated in the annexed drawings.

Finally.

Figures 1, 2, 3, 4:
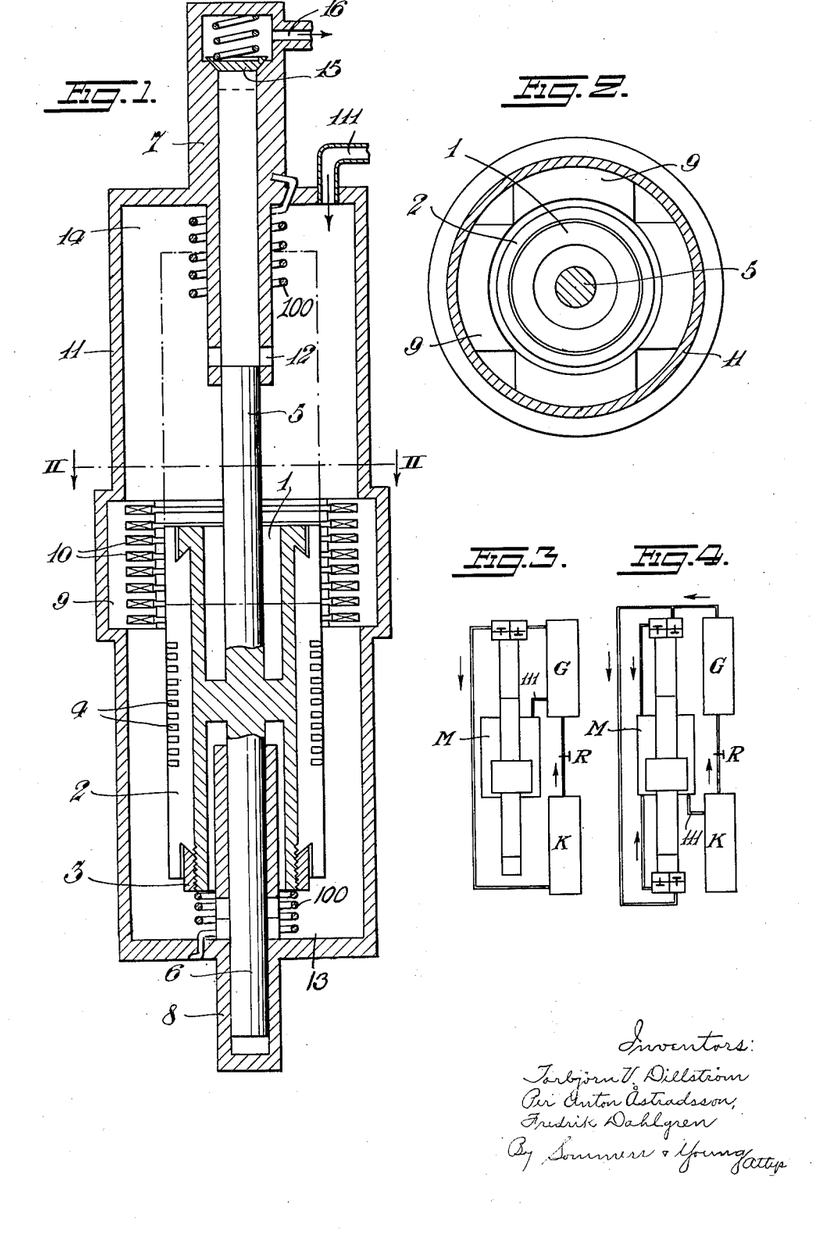
Fig. 1 shows an axial central, longitudinal section through a single-phase asynchronous motor in accordance with the invention, operating as a gas compressor.
Fig. 2 is a cross-section on the line II—II in Fig. 1, seen in the direction of the arrows.
Figs. 3 and 4 are plan views of refrigerating machine plants having asynchronous motors in accordance with this invention.

Refering now to Figs. 1 and 2 of the drawings 1 indicates the armature of the motor. The armature has radial sheet-iron laminae 2 insulated from each other and secured by means of a threaded ring 3 in the usual manner. In the middle of the armature, as counted in the axial direction, copper rings 4 are placed in peripheral slots, which are, by preference, partly closed. Preferably, the rings 4 are insulated from the armature but this is no substantial feature. Said rings may also be electrically connected with each other at one or more places, not shown in Fig. 1, by bars extending along generatrices of the cylindric surface of the armature. The journals of the armature are formed to pistons 5, 6 running in cylinders 7, 8. Around the armature four magnetic systems 9 are arranged consisting of plates of sheet-iron or laminae extending substantially in axial planes and having slots for receiving single-phase windings 10 for alternating current. The slots may extend in the axial or the peripheral direction and are, by preference, also partly closed. The windings 10 are windings of the type used in the usual rotary single-phase asynchronous or induction motors, but are cut open or developed and may extend in the axial direction instead of extending in the peripheral direction as usual. The coils of the magnetic systems may extend across several or all of the four magnetic systems, and in said latter case they will assume the shape of closed rings placed in slots corresponding to each other in the four magnetic systems. Said magnetic systems 9 are secured in the outer casing or shell 11, which also carries the two cylinders 7 and 8. Said cylinders are provided with apertures or slots 12, 13 forming communications between the interior of said cylinders and the space 14 within the shell 11. An inlet tube 111 for the gas to said space 14 is arranged in the wall of said shell and the cylinder 7 is in addition provided with a spring-pressed delivery valve 15 and an outlet for the gas compressed. Helical springs 100 are secured to the casing 11 and aid in reversing the motion of the armature 1 at the ends of its strokes.

The motor described acts as follows:

Assuming that the armature occupies the position shown in Fig. 1 and that a single-phase alternating current is supplied to the windings 10, the iron core of the armature 1 will be attracted by the uppermost parts of the magnetic systems 9 so that the armature will receive an impulse of motion upwards. If the armature does not occupy one of its extreme positions, an initial impulse of motion must be imparted to it in any way desired, for instance, by hand, by compressed air etc. At the vertical position of the motor, as shown in Fig. 1, the armature will, however, automatically sink by gravity to its lowermost position shown in Fig. 1, when the motor is stopped. After the motor has thus been initially actuated the copper rings 4 enter the magnetic fields generated by the magnetic systems 9 and are consequently actuated by an electromagnetic force in the direction of motion of the armature as a result of the induced currents, as well-known from the theory of asynchronous motors. Thus, the armature is accelerated in its motion upwards and compresses the gas in the cylinder 7 and simultaneously rarefies the gas in the cylinder 8, until a new quantity of gas enters through the aperture 13, when the latter is laid open at the end of the stroke. The compressed gas in the cylinder 7 escapes to a great extent through the valve 15 and the outlet 16. The work of compression delivered during the stroke absorbs the energy of the armature and brings the armature to stop in the uppermost position indicated by dotted lines in Fig. 1. The compressed gas still remaining in the cylinder 7 has a pressure substantially determined by the force of the spring acting upon the valve 15 and by the back-pressure from the gas in the casing above said valve and will then actuate the armature to move in the opposite direction i. e. downwards as in Fig. 1, said motion in the opposite direction being also aided by the attractive action of the lowermost parts of the windings 10, on the armature 1 and further by gravity. When the shortcircuited copper rings 4 arrive into the magnetic fields of the magnetic systems 9 again the armature is also actuated by an electromagnetic force in its direction of motion, i. e. downwards and thus accelerated. During this downward motion of the piston 6 the gas enclosed in the cylinder 8 is compressed and finally causes the armature to stop and then to be reversed, the magnetic action of the uppermost portion of the winding 10, on said armature, aiding in this operation. At this downward motion the slots 12 are laid open so that a new quantity of gas from the inlet 111 flows into the cylinder. This cycle is then repeated.

In the embodiment described the cylinders and the pistons moving in them effect the reversal of the armature with the aid of the magnetic forces acting on the ends of the armature. For reversing the armature, springs, alone or in combination with the devices just mentioned, may, however, be used. It is important for this purpose that the forces acting in the opposite direction of motion come into action immediately after the armature has been stopped and also with the greatest intensity, because it is very advantageous for the efficiency and for the output that the armature attains its maximum speed as soon as possible after the reversal. Said maximum speed should be only a little less than the synchronous speed. The useful output is supplied to the armature substantially in the middle of the stroke of the armature, when the conductors of the armature are in the magnetic fields of the magnetic systems.

The construction of the embodiment illustrated in Figs. 1 and 2 may be varied in different manner within the scope of this invention. Thus, for instance, the compressor may be double-acting by providing the cylinder 8 with a delivery valve or check valve also. Both cylinders may be provided with a suction valve as well as delivery valve, as usual in compressors.

In the embodiment shown in Figs. 1 and 2 all the rings 4 are entirely withdrawn from the action of the magnetic fields of the windings 10, when the speed of the armature is low, i. e. when the armature is in or near its end positions. Thus, the energy losses, which otherwise would be very high in these end positions, are reduced to an extremely low value. The outermost, that is, the uppermost and lowermost, rings may be made with a higher resistance than that of the middle rings, and as a result of this the energy losses mentioned are reduced very much so that the outermost rings may in their end positions be within the windings without reducing the efficiency considerably.

As stated above the motor in accordance with this invention may advantageously be used for operating refrigerating plants. Fig. 3 shows how the combined motor and compressor, for instance, in accordance with Figs. 1 and 2, is connected to a closed refrigerating system. M indicates the combined motor and compressor, which is connected with the refrigerator G and the condenser K by pipes to a closed system, as illustrated in the drawings. The interior (space 14) of the motor is connected with the generator by the pipe 111. R is a regulating valve. After being compressed in the motor the cooling medium passes through the condenser to be condensed. Then the cooling medium flows through the throttle valve R to the refrigerator G to expand and absorb heat, whereupon the vapours are sucked into the motor M again.

In the modification shown in Fig. 4 the interior (space 14) of the motor is connected with the condenser. In this case the cooling medium circulating in the system also serves as a lubricant for the compressor pistons. On account of the higher pressure which is preferably kept near the saturation pressure corresponding to the temperature prevailing in the motor the cooling medium condensed on the walls of the cooled cylinders is prevented from evaporating rapidly. In Fig. 4 the motor is double-acting, but this is not essential.

Instead of the mechanical means for reversing the motion of the armature, when operated with single-phase alternating current, exclusively electric means may also be used, as shown in Figs. 5 to 11 and described below.

Figure 5:
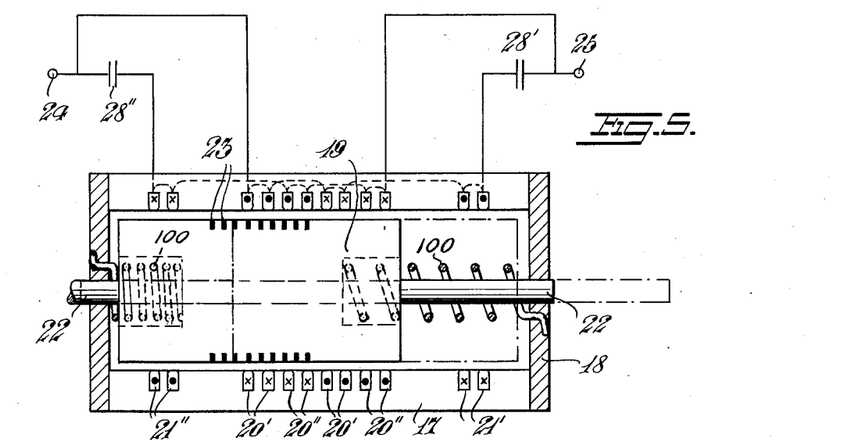
Fig. 5 is an axial longitudinal section through another embodiment of a single-phase asynchronous motor in accordance with the invention, having auxiliary windings for reversing the forces actuating the armature.

In Fig. 5 the reference character 17 indicates the iron plates of the stator which, by preference, are arranged radially in relation to the shaft 22 of the armature and are held together by end plates 18 of any suitable design. The iron core of the armature 19 is, preferably, also laminated and is thus composed of iron plates standing radially to the shaft 22. The stator is provided with slots in which the primary windings 20', 20'', 21', 21'' are placed. The motor winding proper consists of the main coils 20', 20'' while the two auxiliary windings 21', 21'' are so-called phase splitting windings serving to generate an artificial second phase. In the embodiment shown the armature 19 is freely slidable in its axial direction, its shaft 22 being guided in the end plates 18. The armature carries a short-circuit winding 23 which may consist of copper rings just as shown in Fig. 1. For the mode of operation it is immaterial whether the stator winding is designed as a coil winding or as simple annular coils coaxial with the shaft of the armature, i. e. if the winding is provided with axial end-connections or not.

The stator winding is connected with a single-phase source of alternating current by means of the terminals 24, 25.

Figure 6:
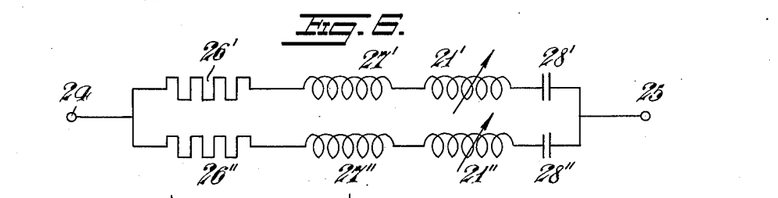
Fig. 6 is a diagram illustrating the circuits of the motor shown in Fig. 5.

As is best seen from the diagrammatic view of Fig. 6 the conductors between the terminals 24 and 25 are grouped into two parallel circuits, indicated by the indices "and" in the drawings and also in the following specification. In Fig. 5 the connections between the parts of the winding embedded in the slots are indicated by dotted lines. Each of said circuits consists of three elements, which may be connected in series or parallel in various manners, but are, by preference, connected in series. Said elements are the motor windings proper 20', 20'', the auxiliary coils 21', 21'' and the fixed condensers 28', 28''. In the diagram of connections shown in Fig. 6, 26' and 26'' indicate the active resistance of the total circuits in question including the load resistance, when operated as a motor while 27', 27'' represent the inductances of the motor windings 20', 20'' and 21', 21'' the variable inductances of the two auxiliary windings 21', 21''.

The mode of operation of this motor depends upon the variable inductance or reactance of the two coils 21', 21''. It is evident that in the position of the armature 19 shown in Fig. 5 the coil 21'' has an inductance much higher than that of the coil 21' while in the opposite position shown in dotted lines the inductance of the coil 21' is higher than that of 21'', because the inductance depends upon whether the iron core is within the corresponding coil or not. It is also evident from Fig. 5 that the individual elements of the motor windings 20', 20'' are arranged alternately and have such directions of winding that the windings constitute a two-phase system of the usual type, provided that the currents flowing in the two circuits have a phase displacement of about 90° in time. The necessary phase displacement is automatically effected by the fixed or non-adjustable condensers 28', 28'' and the inductances 21', 21'' variable at the running of the motor, the condensers and coils being dimensioned in such manner that in the position shown in Fig. 5 the natural frequency of the oscillation circuit 21', 28' is higher than the frequency of the net feeding the motor while the natural frequency of the circuit 21'', 28'' is lower than said frequency of the net. In the opposite position of the armature the case is the reverse.

Considering a circuit consisting of a coil having the inductance L henrys in series with a condenser having the capacity C farads and fed with current from a net having the angular frequency ω it is easy to show that the impedance of the whole circuit connected in series is determined by the following equations (1) If
$$L < \frac{1}{\omega^2 C}$$

the whole circuit is equivalent with a condenser having the capacity $$C_s = \frac{C}{1 - \omega^2 L C}$$

(2) If
$$L > \frac{1}{\omega^2 C}$$

the whole circuit acts as an inductance of the size $$L_s = L\left[1 - \frac{1}{\omega^2 L C}\right]$$

Figure 7A:
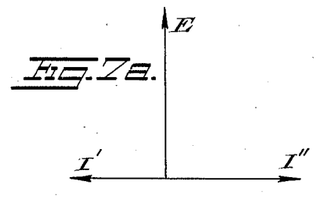
Fig. 7a shows the position of the vectors for the current and the voltage of the two circuits of Figs. 5 and 6, provided that the impedances of the motor windings may be neglected.
Figure 7B:
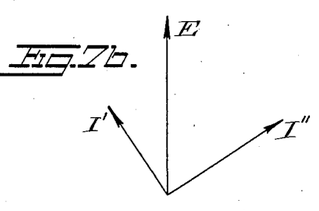
Fig. 7b shows the position of the same vectors for the current and the voltage with due regard paid to the impedances of the main windings and the ohmic resistances of the auxiliary windings.

In the position shown in Fig. 5 the winding 20' is thus connected in series with a capacity and the winding 20'' in series with an inductance. If the impedance of the motor winding 20', 20'' could be neglected, the currents in the two circuits would have a phase displacement of approximately 180° in relation to each other, as illustrated in Fig. 7a, in which E is the voltage of the net and I' and I" the currents of the circuits carrying the corresponding indices. But the impedances of the motor windings and the ohmic resistances of the auxiliary windings i. e. the elements 26', 26", 27', 27" in Fig. 6 cause a rotation of the phase of the vectors to the position illustrated in Fig. 7b, the phase displacement being thus changed to about 90°. Consequently, when the armature is in or near its end position, an electric two-phase system is obtained which then will generate a force on the armature directed to the opposite end position, that is, inwards, so that the armature is drawn out of its end position and accelerated in the direction towards its opposite end position. But when the armature is in its middle position, the two circuits mentioned above are equivalent and thus form a single-phase system. At this moment the armature has, however, attained its maximum speed and is driven further by the single-phase action, that is, asynchronously. Shortly before the armature arrives into its opposite end position the phase splitting action again comes into effect, the force generated having then the opposite direction and stops the armature and then accelerates it in the opposite direction. The reciprocating motion is thus maintained without any mechanical means or electrical interrupters, although additional mechanical means, for example springs 100, may be used to aid in reversing the motion of the armature, as shown. It is obvious that the useful output is substantially developed near the maximum speed and is delivered by the directed single-phase, asynchronous action on the armature, which has received an initial speed.

Figure 8:
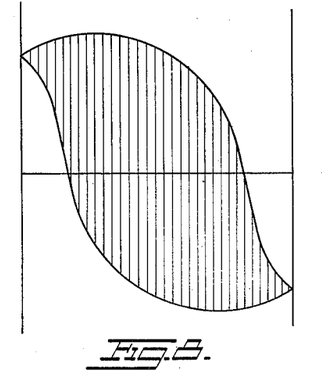
Fig. 8 shows the variation of the electrodynamic force in different positions of the armature of the motor illustrated in Fig. 5.

The variation of the electro-dynamic force in dependence of the position of the armature is shown in the diagram of Fig. 8, in which the abscissas represent the positions of the armature and the ordinates the corresponding forces acting on it—measured in a pre-determined direction. The sectioned surface is a measure of the work for each complete stroke.

It might be feared that the auxiliary coils 21', 21" should create a tendency of stopping the armature in certain positions, but it may be shown theoretically that the resulting magnetic forces generated by said coils may be adjusted or entirely eliminated by dimensioning said coils accordingly. The condition that no magnetic forces on the armature shall be directly caused by said coils, does only imply that the sum of the inductances of the coils shall be independent of the position of the armature. This condition should be fulfilled at least approximately for a good design. In certain cases it may be advantageous not to eliminate said forces derived from the auxiliary coils but to give the motor intentionally a certain tendency to a stable equilibrium in the middle position of the armature or, in other words, to use also in the embodiment shown in Fig. 3, the magnetic action of the motor winding on the ends of the armature existing in the embodiment shown in Fig. 1, so that an auxiliary force is obtained for reversing the armature in its end positions.

Figures 9, 10:
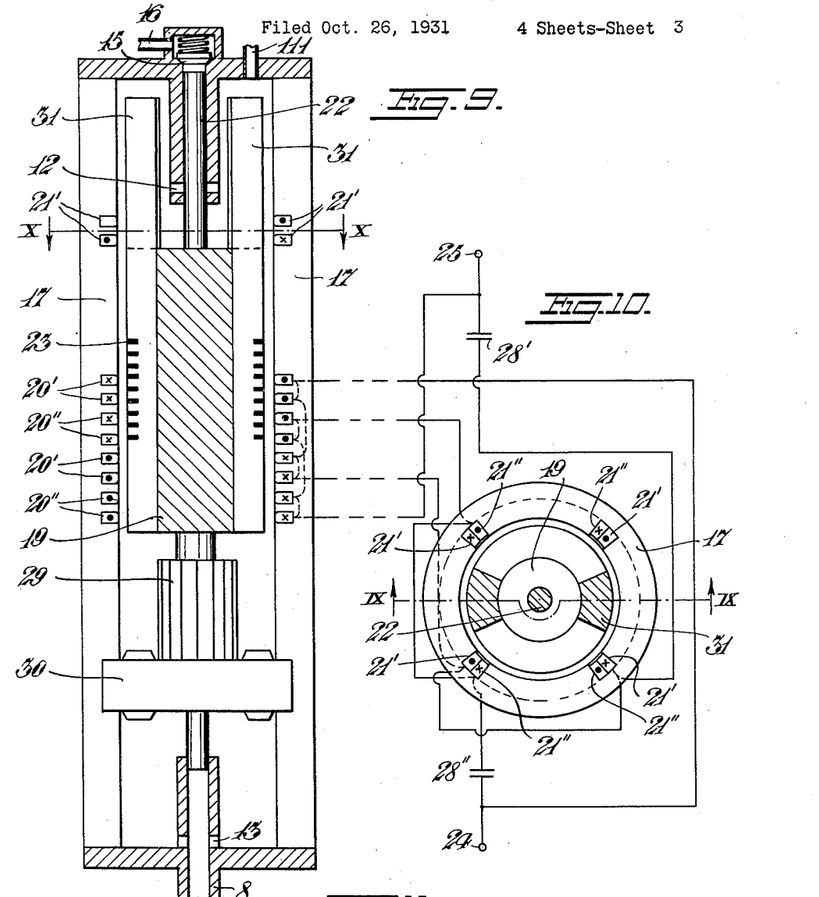
Fig. 9 is an axial longitudinal section on the line IX—IX in Fig. 10 through a modified embodiment of the single-phase asynchronous motor shown in Fig. 5.
Fig. 10 is a cross-section on the line X—X in Fig. 9, seen in the direction of the arrows. The connections shown in dotted lines between Figs. 9 and 10 are made to illustrate how the auxiliary windings are connected with the main windings.

In certain cases, for instance, if the motor is to be used for driving a pump or a compressor, it may be advantageous to give to the armature reciprocating in the axial direction, also a rotary motion around its longitudinal axis, said rotary motion being independent of the reciprocating motion. Such an embodiment is shown in Figs. 9 and 10 which differs from the motor shown in Fig. 5 by the fact only that the auxiliary coils are arranged in another manner and that the motor is provided with a device for imparting a rotary motion to the armature. In the embodiment shown said device consists of a short-circuited ring armature 29 in combination with a stator winding 30 of the construction known from the rotary asynchronous motors, by preference, a two-phase winding or a single-phase winding having an artificial second or starting phase. In this case the auxiliary coils 21', 21" are not designed as simple annular coils of the type shown in Fig. 5, but have the shape of coils covering or enclosing a part of the whole periphery of the armature. Each of said windings is divided into two coils, arranged concentrically and diametrically opposite to each other and extending across about one fourth of the stator periphery. The connections drawn in dotted lines between Figs. 9 and 10 indicate diagrammatically how the auxiliary windings of Fig. 10 are connected with the motor or main windings. The iron plates of the armature are at the top prolongated at two diametrically opposite sides and form two concentric iron cores 31. When the armature rotates said iron cores are alternately in the air gaps of the magnetic fields of the auxiliary coils 21', 21" and thus vary the inductances of said coils. Thus, the iron cores 31 are in the air gap between the coils 21' when the armature assumes the position shown in Figs. 9 and 10, so that the inductance of said coils is considerably higher than that of the coils 21", while after a rotation of 90° from this position the inductance of the coils 21" is higher than that of the coils 21'. Just in the same manner as that described above in connection with Fig. 5 the phase displacement desired is thus effected. When the iron cores 31 are in the magnetic field of the auxiliary coils 21' a two-phase system is at hand drawing the armature in one direction, while the armature is drawn in the opposite direction when the cores 31 are in the magnetic field of the coils 21" and thus the other two-phase system is brought about. During one complete rotation the armature thus will perform two complete strokes up and down. In contrast to the embodiment shown in Fig. 5 the phase splitting is in this case brought about during almost the entire stroke.

Figure 11:
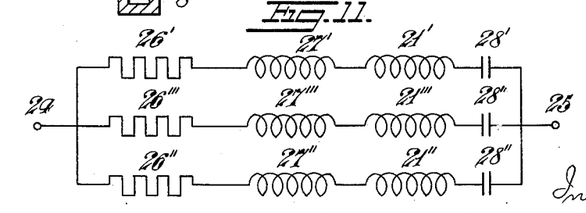
Fig. 11 is a diagram to illustrate the circuits, if the motor in accordance with Figs. 5, 9 and 10 is wound as a three-phase motor.

Instead of the two-phase system illustrated in Figs. 5–10, a three-phase system may also be used. By dimensioning the inductances and the capacities of the branch circuits accordingly it is possible to displace their currents 120°, instead of 90°, in relation to each other. If the two branch circuits just mentioned are combined with a third circuit whose inductance and capacity are chosen in such manner that the current flowing in said third circuit is 60° in advance of one of said currents and lags 60° after the other, a common three-phase system is attained. In other words, to have such a three-phase system it is only necessary to replace, in Figs. 9–10, the two-phase auxiliary windings 21', 21" by corresponding three-phase windings 21', 21", 21''', and further to substitute for the two-phase main windings 20', 20" three-phase main windings 20', 20", 20'''. In this case three fixed condensers 28', 28", 28''' are necessary. In other respects the motor is quite analogous to that shown in Figs. 9–10. Fig. 11 shows a diagram of connections of a motor having a three-phase system of this type, the elements of the third circuit being indicated by '''. From this figure it is evident that the middle phase (''') remains unaffected, while the two outer phases (' and '') vary periodically. The sequence of the phases during a stroke is consequently I III II and II III I.

The devices described may also be provided with mechanical means for reversing the motion of the armature such as, for instance, springs like 100 acting on the armature in its extreme positions. The compression cylinders 7, 8 in Fig. 9 also constitute such mechanical means.

If single-phase alternating current is used for driving the armature, as described above, the useful forces from the main windings on the armature always have the same direction as the direction of motion of the latter and are, therefore, reversed when the motion of the armature is reversed. In using multi-phase current for driving the motor the direction of the forces from the main windings cannot be reversed in this manner, because the magnetic field generated by one and the same multi-phase system generates forces in a direction which is independent of the direction of motion of the armature. To bring about the desired reversal of direction of the forces from the main windings, when polyphase current is used, the armature is in accordance with this invention given such a motion that the conductors on it are withdrawn from the action of the magnetic fields of the windings for a while and possibly introduced into the magnetic fields of the other windings which then will generate forces acting on the armature in the opposite direction. This may be attained in a simple manner by giving the armature a rotary motion about its longitudinal axis, while the magnetic systems, which extend substantially axially and are fed with multi-phase current and generate magnetic fields travelling in the longitudinal or axial direction, are preferably extended across a portion of, for instance, half of the periphery of the armature only and the conductors of the armature, in which said magnetic fields shall induce currents, are arranged on parts of the armature limited by generatrices of the armature surface and the other parts between said first parts are free from such conductors.

Figure 12:
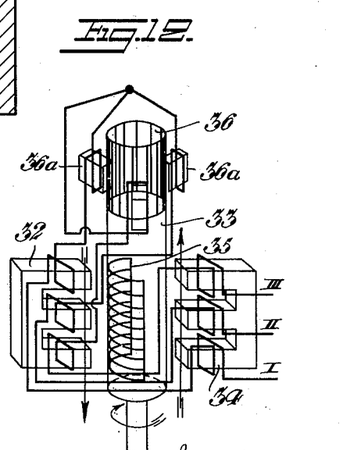
Fig. 12 is a diagrammatic perspective view of a three-phase asynchronous motor embodying this invention.
Figure 13:
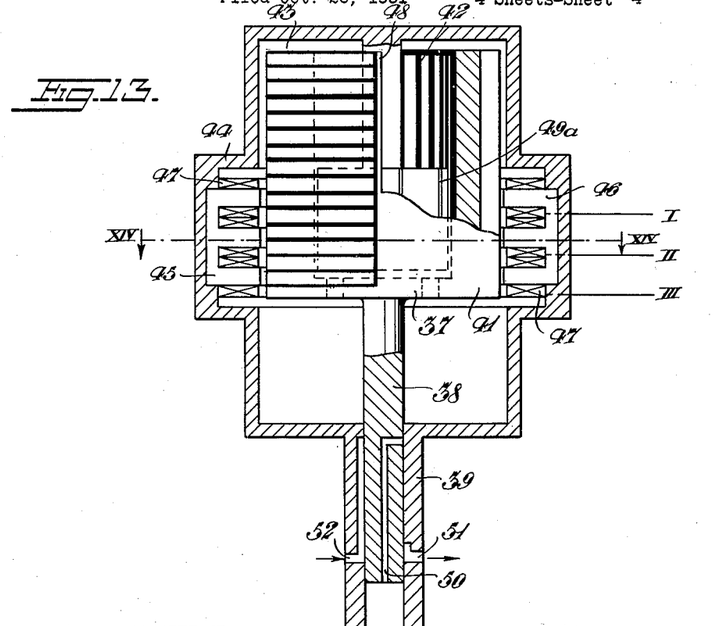
Fig. 13 is an axial longitudinal section through a three-phase motor of the type shown in Fig. 12.
Figure 14:
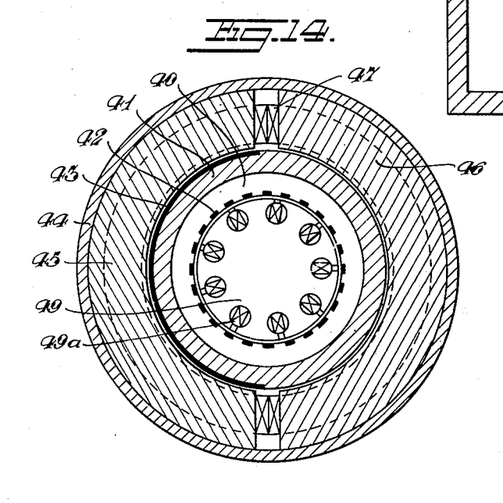
Fig. 14 is a cross-section on the line XIV—XIV in Fig. 13, seen in the direction of the arrows.

One embodiment of a three-phase motor of this type is illustrated by way of example in Figs. 12–14. In Fig. 12, 32 indicates a magnetic three-phase system generating—in a well-known manner—a continuous travelling magnetic field directed from the top downwards whose lines of force enter the armature 33 almost vertically. A similar magnetic system 34 on the opposite side of the armature is wound in such manner that its continuous magnetic field travels from below upwards. The armature 33 consists of thin iron-sheets insulated from each other and arranged radially. The armature carries on one side a grid 35 and at its top a small short-circuit ring armature 36 of the construction known from three-phase motors. The short-circuit armature is surrounded by a three-phase winding 36a generating a rotary field.

This motor acts as follows:

The winding 36a rotates the armature 36 and consequently also the armature 33 around its longitudinal axis, so that the travelling magnetic fields generated by the magnetic systems 32 and 34 alternately pass through the grid 35. When said grid is in the magnetic field of the system 32 it is actuated by a force directed downwards, while it is actuated by a force directed upwards when it is in the magnetic field of the system 34. The armature itself is not actuated by the lines of force because it is composed of thin iron-sheets insulated from each other. Because the armature is rotated said two forces directed upwards and downwards, respectively, will alternately act on the grid to reciprocate the armature. For each complete rotation the armature will perform a complete stroke up and down.

A practical embodiment of this motor is illustrated in Figs. 13 and 14. The armature 37 is provided with a journal or piston 38 running in a cylinder 39. The armature is composed of two annular cylindrical portions 40, 41 rigidly connected with each other. On its inner mantle surface the cylinder 40 carries the conductors 42 short-circuited at both ends and insulated from each other or not. The cylinder 40 is made of thin rings of sheet-iron insulated from each other. The cylinder 41 is made of radial sheet-irons lying in axial planes and also insulated from each other. Said cylinder 41 carries a grid 43 on its external mantle surface. The enclosing casing or shell 44 which carries the cylinder 39 and also the three-phase magnetic systems 45 and 46 having the shape of annular segments with three-phase windings 47 to form magnetic systems of the type shown at 32 and 34 in Fig. 12. A holder or journal 48 secured to the shell 44 carries the magnetic system 49 which has three-phase windings 49a, is placed within said cylinder 40 and generates a rotary field in well-known manner, just like the windings 36a in Fig. 10. Said rotary field rotates the armature. In the journal 38 a channel 50 is bored and in the wall of the cylinder 39 an outlet slot 51 and an inlet slot 52 are made.

This motor acts in exactly the same manner as that shown in Fig. 10. Thus, the armature 37 is rotated by the action of the rotary field of the magnetic system 49, 49a on the conductors 42 and receives its reciprocating motion from the alternate action of the magnetic systems 45 and 46 on the grid 43. At the downward motion the gas in the cylinder 39 is compressed and at the end of the compression stroke the upper portion of the channel 50 extending laterally will register with the outlet opening 51 to let the compressed gas flow out. At the continued motion of the armature said communication is cut off and the laterally extending portion of the channel 50 will register with the slot belonging to the inlet opening 52. Said latter communication is maintained during the whole suction stroke and is cut off at the end thereof, whereupon the compression begins again. Thus, moved valves are not used and consequently the motor is very reliable. The slot mechanism may be of other design.

The magnetic fields travelling in the axial direction have a constant speed depending upon the frequency of the primary current. As the speed of the armature varies during the stroke, the armature will have different slips in relation to said constant magnetic field. If the grid is of equal shape to its total length, the maximum force of the armature will, therefore, be obtained at a certain, most favourable slip only. But if the conductors of the grid have a relatively high resistance at their ends which are actuated by the magnetic fields, when the speed of the armature is low, the maximum force on the armature will be obtained during substantially the whole stroke. To have such higher resistance at the ends of the grid the peripheral conductors thereof at both ends of the grid may be made with a smaller cross-sectional area than that of the peripheral conductors at the middle of the grid, as shown in Fig. 13.

The invention may be embodied in many different ways without exceeding the scope of the invention and the constructional features may be varied within wide limits. Also the three-phase or multi-phase motors may be provided with mechanical means for aiding the electrical means in reversing the armature. When the motor embodying the invention is designed as a compressor or used for other purposes causing mechanical forces of reaction to appear at the ends of the path of the armature, said forces of reaction constitute themselves such mechanical means.

It is a well-known matter of fact that the usual asynchronous motors work under unfavourable conditions at low speeds if they shall have a good efficiency at higher speeds. But in motors in accordance with this invention the particular power-generating means will effect the reversal of the armature independent of the main windings, so that the conductors of the armature during its reversal may be withdrawn from the field created by the main windings to reduce the losses otherwise unavoidable. Thus, the efficiency of the motor in accordance with this invention is highly increased.

The term "one single frequency" used in this specification and in the appended claims shall comprise the usual commercial currents having one predominant frequency but also feeble higher harmonics.

What we claim is:

1. In an electric alternating current induction motor, primary windings, means for continuously and uninterruptedly exciting said primary windings by alternating current having substantially only one frequency, a reciprocating armature of the induction type, and means for reversing said armature in its end positions.

2. In an electric induction motor, primary main windings, means for continuously during operation connecting said primary windings with a commercial alternating current net for a substantially sine-shaped current having substantially one single frequency only, a reciprocating induction armature adapted to be excited exclusively by induction from said primary windings, and means for reversing said armature in its end positions.

3. In an electric induction motor, main windings, means for continuously during operation exciting said main windings with alternating current of the commercial type having substantially one single frequency, an induction armature having at least one short-circuited winding, rectilinear guides for said armature in the axial direction thereof, and means for reversing the direction of motion of said armature at the ends of its path.

4. In an electric induction motor, main windings, means for exciting said main windings in operation continuously with alternating current of substantially one single frequency and substantially sine-shaped and of a fixed order of delivery of the phases, a reciprocating induction armature, guides for said armature along said main windings, and mechanical means for absorbing a portion of the kinetic energy of the armature at the end of its motion in one direction and for delivering it again to the armature to accelerate the latter in the opposite direction.

5. In an electric induction motor, primary windings, means for uninterruptedly and continuously exciting said primary windings by alternating current of substantially one single frequency, a reciprocating induction armature, pistons on said armature, and cylinders for said pistons to absorb a portion of the kinetic energy of the armature at the ends of its path and to deliver said energy immediately again to said armature to reverse the latter.

6. In an electric induction motor, at least one primary main winding, means for exciting said primary winding by continuous and uninterrupted substantially sinusoidal alternating current having substantially one single main frequency, an induction armature, at least one short-circuited winding on said armature, guides for said armature adapted to guide the same to a reciprocating motion in relation to said main windings, mechanical means for absorbing a portion of the kinetic energy of said armature at the ends of its path of motion and for immediately delivering it again to said armature, and auxiliary primary electric windings serving to generate reversing forces on said armature at the ends of its path of motion, said primary main and auxiliary windings being permanently interconnected.

7. In an electric induction motor, main windings, means for exciting said main windings continuously and uninterruptedly by unmodified alternating current having at least one phase and having one fundamental frequency only, an induction armature having one or more closed windings on its surface, guides for said armature to allow it to perform a reciprocating motion in relation to said main windings in such manner that said windings on said armature are at least partially withdrawn from the action of said main windings at the ends of the path of motion of said armature, and means for reversing the direction of motion of said armature at the ends of the path of motion thereof.

8. In an electric induction motor, stationary primary windings, means for exciting said primary windings continuously and uninterruptedly by alternating current having at least one phase and having a single fundamental frequency and an invariable order of phases during the operation, a reciprocating induction armature having a short-circuited winding adapted to be excited exclusively by said primary windings, the parts of said short-circuited winding next to the primary windings at the ends of the path of motion of said armature having a higher resistance than that of the remaining portion of said short-circuited winding, and means for reversing the direction of motion of said armature at the ends of the path of motion thereof.

9. In an electric induction motor, a reciprocating induction armature, a stator, a main winding on said stator, means for exciting said main winding in operation by continuous and uninterrupted single-phase alternating current, an auxiliary winding on said stator connected with said main winding to form a system, means for varying the impedance of said system to generate at least one auxiliary phase in addition to the main phase directly generated by said single-phase current, said auxiliary phase coming in force at the ends of the path of motion of said armature to reverse said armature, and mechanical means for absorbing a portion of the kinetic energy of said armature at the ends of its path of motion and for immediately delivering said absorbed kinetic energy again to said armature to accelerate it in the opposite direction.

10. In an electric motor, a stator, a reciprocating asynchronous armature, main windings on said stator fed with single-phase alternating current, auxiliary windings on said stator connected with said main windings to form at least two parallel circuits, means for varying the impedances of said parallel circuits in dependence of the motion of said armature to effect a variable phase displacement of the currents flowing in said parallel circuits in relation to each other to form at least one auxiliary phase for effecting a reversing action on said armature, and mechanical means for absorbing a portion of the kinetic energy of said armature at the ends of its path of motion and for immediately returning said absorbed kinetic energy to said armature in the opposite direction.

11. In an electric motor, a stator, a reciprocating armature, main windings on said stator fed with single-phase alternating current, auxiliary windings on said stator connected with said main windings to form three parallel circuits, means for varying the impedances of two of said parallel circuits in dependence of the motion of said armature to effect a variable phase displacement of the currents flowing in said two circuits in relation to each other and to the current in the third, invariable parallel circuit to form a three-phase system for effecting a reversing action on said armature, and mechanical means for absorbing a portion of the kinetic energy of said armature at the ends of its path of motion and for returning said absorbed energy immediately to said armature in the opposite direction after said armature has been stopped.

12. In an electric motor, a stator, main windings on said stator fed with single phase alternating current, auxiliary windings on said stator connected with said main windings to form at least two parallel circuits, air gaps in said auxiliary windings, an asynchronous armature, guides for said armature to allow it to reciprocate in a path, at the ends of which said armature is alternately in said air gaps to vary the impedances of said parallel circuits for causing a reversing action on said armature at the ends of the path of motion thereof, and mechanical means for absorbing a portion of the kinetic energy of said armature at the ends of its path of motion and for returning said absorbed energy to said armature in the opposite, direction immediately after it has been stopped.

13. In an electric motor, a stator, main windings on said stator fed continuously without any interruptions during the service with single-phase alternating current, auxiliary windings on said stator connected with said main windings to form at least two parallel circuits, air gaps in said auxiliary windings, an asynchronous armature, parts of the iron core of said armature projecting into the air gaps of one of said auxiliary windings, an additional short-circuit winding on said armature, guides for said armature to allow it to be reciprocated in a rectilinear path, an additional winding on said stator fed with said alternating current to cooperate with said additional winding on the armature to rotate the latter to bring said projections alternately into said air gaps so as to cause a reversing action on said armature at the ends of the path of motion thereof by varying the impedances of said parallel circuits, and mechanical means for absorbing a portion of the kinetic energy of said armature at the ends of its path of motion and for returning said absorbed energy to said armature in the opposite direction immediately after it has been stopped.

14. In an electric motor, a stator, at least one main winding on said stator fed with single-phase alternating current, auxiliary windings on said stator, a reciprocated asynchronous armature, means for splitting the phase of said alternating current at the ends of the path of said armature to cause a reversing action on said armature, and mechanical means for absorbing some of the kinetic energy of said armature and for returning said absorbed energy to said armature in the opposite direction immediately after said armature has been stopped.

15. In an electric motor, a stator, a reciprocating induction armature, main windings on said stator, means for uninterruptedly and continuously exciting said main windings by single-phase alternating current, auxiliary windings on said stator permanently connected with said main windings to form at least two parallel circuits, and means for varying the impedances of said parallel circuits in dependence of the motion of said armature to effect a variable phase displacement of the current flowing in said parallel circuits in relation to each other to form at least one auxiliary phase for effecting a reversing action on said armature.

16. In an electric motor, a stator, at least one main winding on said stator, means for uninterruptedly in operation exciting said main winding by single-phase alternating current, an auxiliary winding on said stator permanently connected with said main winding, a reciprocating induction armature, and means for splitting the phase of said alternating current at the ends of the path of said armature to cause a reversing action on said armature.

17. In an electric induction motor, a primary winding, means for exciting said winding uninterruptedly in operation by commercial alternating current, an induction armature movable to and fro and short-circuited in operation, and means for reversing the direction of motion of said armature automatically in the end positions of its to and fro motion.

TORBJÖRN VIKTOR DILLSTRÖM.
PER ANTON ÅSTRADSSON.
FREDRIK DAHLGREN.